W. H. GOSS.
RODENT TRAP.
APPLICATION FILED MAY 19, 1919.

1,316,788.

Patented Sept. 23, 1919.

INVENTOR.
William H. Goss
BY
*Percy S. Webster*
ATTORNEY

UNITED STATES PATENT OFFICE.

WILLIAM H. GOSS, OF HAMMONTON, CALIFORNIA.

RODENT-TRAP.

1,316,788.

Specification of Letters Patent.  Patented Sept. 23, 1919.

Application filed May 19, 1919.  Serial No. 298,215.

*To all whom it may concern:*

Be it known that I, WILLIAM H. GOSS, a citizen of the United States of America, residing at Hammonton, in the county of Yuba and State of California, have invented certain new and useful Improvements in Rodent-Traps; and I do declare the following to be a clear, full, and exact description of the same, reference being had to the accompanying drawings, and to the characters of reference marked thereon, which form a part of this application.

This invention relates to improvements in rodent traps, and particularly to the spring type commonly used by householders for the catching of mice and rats on the premises.

The principal object of the invention is to provide a trap of the spring actuated type, with a means for keeping the spring set which will release the spring and actuate the trap when either an upward or downward pressure is exerted on the bait.

Another object is to provide a means for holding the bait in position whereby an attempted movement of the same will positively cause the trap to be sprung.

I have also provided a means for setting the spring of the trap without the danger of the spring slipping and causing the trap-bar to hurt the fingers.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1:
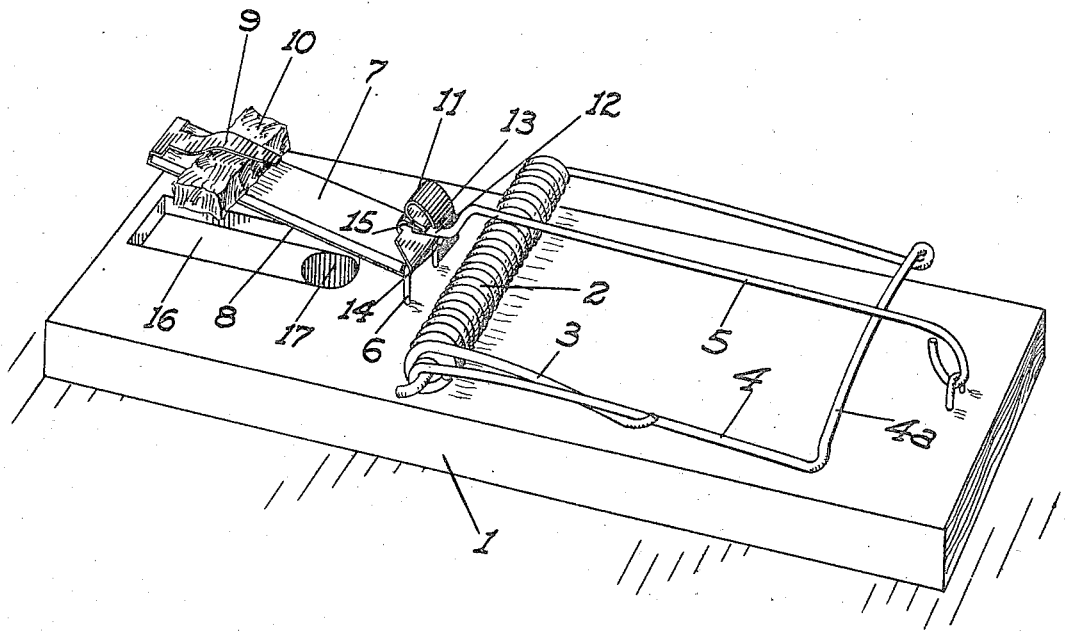
Figure 1 is a perspective view of a trap showing my improvements thereon and with the spring in set position.
Figure 2:
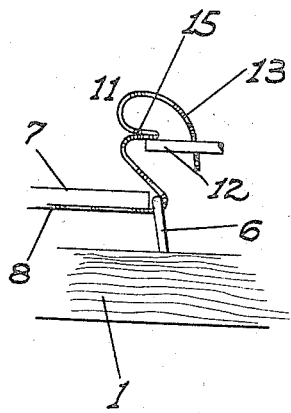
Fig. 2 is an enlarged fragmentary side elevation of a spring-lever retainer.
Figure 3:
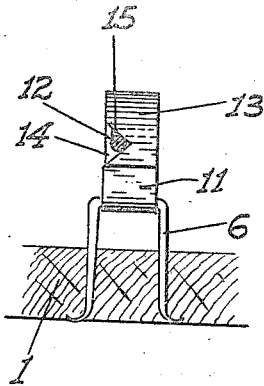
Fig. 3 is an end elevation of the same.

Referring more particularly to the characters of reference on the drawings, the numeral 1 denotes the base of the trap, of any desired size, transversely on which is pivotally mounted the usual coiled spring 2, having a horizontal arm 3 extending from one end thereof adapted to engage one side of a stiff wire trap frame 4 in the usual manner.

A round lever 5 formed of stiff wire is mounted to one end of the base 1, and adapted to bear against the cross bar 4ª of the trap frame to hold the same against undesired movement when the spring is placed in tension by turning the frame back under the lever.

Hinged to the base 1 as at 6 at right angles to the spring 2, and beyond the lever 5 is a treadle 7, having a steel metal plate 8 projecting lengthwise of, and under the same and secured thereto, the end of the plate turning up about the end of the treadle farthest from the spring to form a finger 9 extending a certain distance over the treadle and spaced from the same to hold a piece of bait 10 thereunder, between the finger and the treadle.

The other end of the plate 8 at that end of the treadle having the hinge 6, and which is adjacent the spring 2, and which I term the forward end of the treadle, turns upwardly to form a lever catch 11, for the down turned end 12 of the lever 5. This catch turns up a certain distance beyond the treadle, and then bends forwardly to form a hook 13, provided with a horizontally positioned V-shaped incision 14 cut in one edge thereof and adapted to receive the lever-end 12 therein.

The rear end of the hook portion of the plate is crimped to form a horizontal lug 15 projecting into the hook on a line slightly higher than the axis of the V-shaped incision 14, and on the under side of which the lever-end 12 is adapted to bear.

A groove 16 is provided in the base 1 and extending lengthwise of the treadle to allow the same plenty of play on the hinge.

A finger-hole 17 is also provided in the base 1 under the treadle so that the necessary slanting position of the treadle plate to engage the lever may be had by pushing on the same through the hole, thereby eliminating the danger of the slipping of the spring and hurting the hand, as would be possible were it necessary to set the treadle from the upper side of the same.

While I have shown the device as applied to a small spring mouse or rat trap, the same principle may be utilized on any form of spring trap using bait as a lure.

From the foregoing description it will be seen that any attempt of a rodent to remove the bait from the treadle, either by pulling up or pressing down on the same, will cause the sides of the V-shaped incision in the hook 13 to bear against the end of the lever 5 and force the same from contact with the lug 15, thereby releasing such lever and also the spring-held trap bar 4ᵃ.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent, is:

A rodent trap including a spring controlled trap bar, a lever adapted to bear against the bar and hold the same against undesired movement when the spring is in tension, a bait retaining treadle hinged for vertical movement and adapted to hold one end of the lever when the same is in position against the bar, and means on the treadle whereby a vertical movement of the same in either direction will release the lever and cause the trap to be sprung, such means including a hook on the end of the treadle adjacent the lever, a V shaped incision cut in one edge of the hook and in which the lever is adapted to seat, the same being arcuate in cross section, and a lug in the hook on the under side of which the end of the lever bears.

In testimony whereof I affix my signature.

WILLIAM H. GOSS.

Witnesses:
 MAE BLOCK,
 J. E. EBERT.